United States Patent
Odendall

(10) Patent No.: US 8,291,692 B2
(45) Date of Patent: Oct. 23, 2012

(54) METHOD FOR THE CONTROL OF THE SUPPLIED AIR/FUEL RATIO OF AN INTERNAL COMBUSTION ENGINE

(75) Inventor: Bodo Odendall, Neuburg (DE)

(73) Assignee: Audi, AG, Ingolstadt (DE)

(*) Notice: Subject to any disclaimer, the term of this patent is extended or adjusted under 35 U.S.C. 154(b) by 0 days.

(21) Appl. No.: 11/197,317

(22) Filed: Aug. 5, 2005

(65) Prior Publication Data

US 2006/0032216 A1 Feb. 16, 2006

(30) Foreign Application Priority Data

Aug. 7, 2004 (DE) .................... 10 2004 038 481

(51) Int. Cl.
*F01N 3/00* (2006.01)
(52) U.S. Cl. ...................... 60/285; 60/277; 60/299
(58) Field of Classification Search .................... 60/274, 60/276, 277, 285, 299
See application file for complete search history.

(56) References Cited

U.S. PATENT DOCUMENTS

| | | | | |
|---|---|---|---|---|
| 5,293,740 A | * | 3/1994 | Heppner et al. | 60/274 |
| 5,678,402 A | * | 10/1997 | Kitagawa et al. | 60/276 |
| 5,842,340 A | * | 12/1998 | Bush et al. | 60/274 |
| 5,848,528 A | * | 12/1998 | Liu | 60/274 |
| 5,867,983 A | * | 2/1999 | Otani | 60/276 |
| 5,901,552 A | * | 5/1999 | Schnaibel et al. | 60/274 |
| 6,003,308 A | * | 12/1999 | Tsutsumi et al. | 60/276 |
| 6,119,447 A | * | 9/2000 | Eriksson et al. | 60/274 |
| 6,151,888 A | * | 11/2000 | Schneider et al. | 60/274 |
| 6,289,673 B1 | * | 9/2001 | Tayama et al. | 60/285 |
| 6,311,482 B1 | * | 11/2001 | Yamashita | 60/285 |
| 6,314,723 B1 | * | 11/2001 | Ketterer et al. | 60/277 |

FOREIGN PATENT DOCUMENTS

| | | |
|---|---|---|
| DE | 102 06 675 C1 | 5/2003 |
| DE | 102 43 342 B3 | 1/2004 |
| DE | 196 06 652 B4 | 2/2004 |
| DE | 103 19 983 B3 | 8/2004 |

* cited by examiner

*Primary Examiner* — Thomas Denion
*Assistant Examiner* — Diem Tran
(74) *Attorney, Agent, or Firm* — Novak Druce + Quigg LLP

(57) ABSTRACT

In a method for the control of the supplied air/fuel ratio of an internal combustion engine (1) with a catalytic converter (5) which is located in the exhaust gas line (2) with an integrated oxygen reservoir (6), it is proposed that the air/fuel ratio be controlled as a function of at least one parameter of the internal combustion engine (1), at least one parameter of the catalytic converter (5), and/or as a function of the type and amount of the exhaust gas emissions which are currently occurring, in order to optimize the relative degree of filling of the oxygen reservoir (6) which is contained in the catalytic converter (5) for favorable conversion of the exhaust gas emissions. According to the proposal, matching to the current conversion demand and the current conversion performance is enabled and thus overall improved exhaust gas conversion is implemented.

8 Claims, 5 Drawing Sheets

Vertical axis - conversion

FIG. 3a

| | HC-Emissionen (hoch, mittel, gering) | | |
|---|---|---|---|
| 9 bar | → | ↓ | ↓ |
| 5 bar | ↑ | → | ↓ |
| 1 bar | ↑ | ↑ | → |
| | 1000 1/min | 3000 1/min | 5000 1/min |

FIG. 3b

| | NO$_x$-Emissionen (hoch, mittel, gering) | | |
|---|---|---|---|
| 9 bar | → | ↑ | ↑ |
| 5 bar | ↓ | → | ↑ |
| 1 bar | ↓ | ↓ | → |
| | 1000 1/min | 3000 1/min | 5000 1/min |

FIG. 3c

| | Lambda Vertrimmung | | |
|---|---|---|---|
| 9 bar | neutral | entleeren | entleeren |
| 5 bar | befüllen | neutral | entleeren |
| 1 bar | befüllen | befüllen | neutral |
| | 1000 1/min | 3000 1/min | 5000 1/min |

FIG. 3a
HC emissions (high, medium, low)
FIG. 3B
NO$_x$ emissions (high, medium, low)
FIG. 3c Lambda trimming
entleeren - empty
befüllen - fill Vertical axis – conversion
Austrag – discharge
Eintrag – admission
Zwangsmodulation – forced modulation

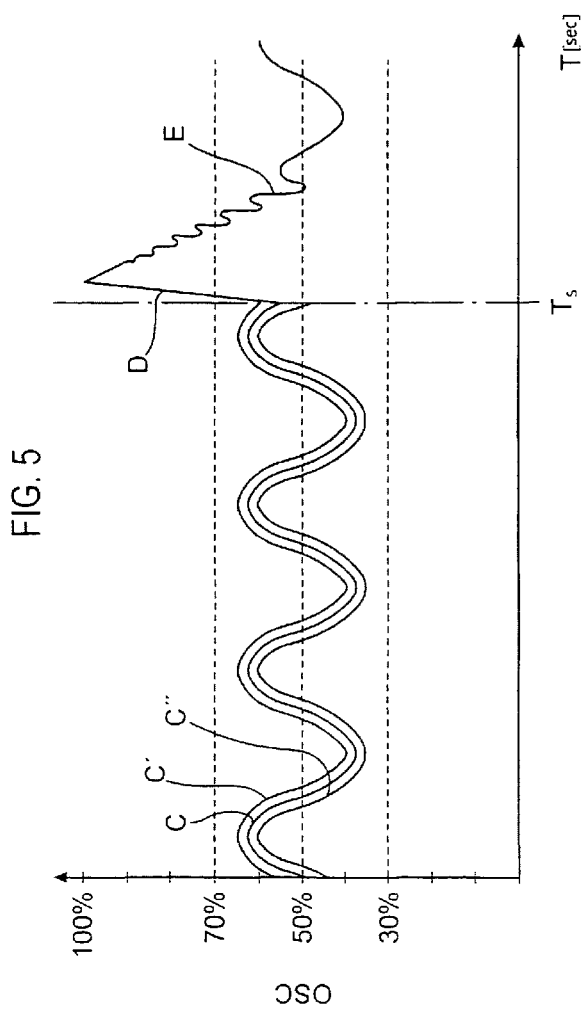

METHOD FOR THE CONTROL OF THE SUPPLIED AIR/FUEL RATIO OF AN INTERNAL COMBUSTION ENGINE

CROSS-REFERENCE TO RELATED APPLICATIONS

This application claims priority from German Application No. 102004038481.9, filed Aug. 7, 2004.

BACKGROUND

This invention relates to a method for the control of the supplied air/fuel ratio of an internal combustion engine with a catalytic converter which is located in the exhaust gas line, with an integrated oxygen reservoir.

Generally the air/fuel ratio supplied to an internal combustion engine is easily controlled such that a constant lambda value of approximately 1 is maintained in order to convert the emissions which occur in the exhaust gas, specifically hydrocarbon and carbon monoxide on the one hand and nitrogen oxides on the other, at any time with good efficiency. This constant lambda control is however not always optimum since the exhaust gas composition can change greatly, especially in transient operation of the internal combustion engine.

Document DE 198 11 257 A1 discloses a process for controlling the exhaust gas aftertreatment of a DI-spark ignition and lean engine, for determining the charging state of the nitrogen oxide reservoir of a catalytic converter the exhaust gas temperature being measured, which together with the other parameters of engine operation, such as for example the transpired time since switching to lean operation, the oxygen content of exhaust gas, and torque fluctuation of the engine, constitutes a measure for the degree of charging of the nitrogen oxide reservoir.

Document DE 103 40 633 A1 describes an exhaust gas emission control means for an internal combustion engine with a three-way catalytic converter and an air/fuel variation element. There the air/fuel ratio is forcibly changed between rich and lean depending on the amount of carbon monoxide stored in the three-way catalytic converter.

Document DE 101 03 772 A1 shows a process for operating a three-way catalytic converter with an oxygen reservoir, the air/ fuel mixture which is supplied to the internal combustion engine being controlled such that the oxygen reservoir of the catalytic converter is kept in a middle setpoint range between a minimum degree of filling and a maximum degree of filling. The drift of the degree of filling can be checked there by making the air/fuel mixture richer and leaner in alternation.

SUMMARY OF THE INVENTION

In this context, the object of this invention is to make available a process for controlling the air/fuel ratio which is supplied to the internal combustion engine, which can be used especially in a catalytic converter with an oxygen reservoir and which takes into account the respective conversion demand by the catalytic converter or the respective conversion capacity of the catalytic converter, so that in steady-state and also in transient operation of the internal combustion engine, compared to the prior art much improved conversion of the emissions contained in the exhaust gas is achieved.

This object is achieved by the air/fuel ratio being controlled as a function of at least one parameter of the internal combustion engine, at least one parameter of the catalytic converter, and/or as a function of the type and amount of the exhaust gas emissions occurring, in order to optimize the relative degree of filling of the oxygen reservoir which is contained in the catalytic converter for favorable conversion of the exhaust gas emissions.

Depending on the operating conditions of the internal combustion engine which are representative of certain exhaust gas emissions at a certain level and which possibly may indicate possible oxygen balancing problems, the oxygen reservoir is run by this control with low, medium or high oxygen filling in order to achieve overall improved pollutant conversion.

Moreover, the degree of filling of the oxygen reservoir can be set to an optimum middle position by taking into consideration the ageing of the catalytic converter which results in different absolute storage capacities.

In addition, the degree of filling of the oxygen reservoir can also be trimmed based on the type and amount of the emissions which occur in the exhaust gas to a correspondingly favorable degree of filling of the oxygen reservoir which as a rule can lie outside the middle position. Moreover it can also be taken into account that the conversion performance of the catalytic converter decreases slightly for large amounts of exhaust gas.

If the internal combustion engine is now operating for example in the steady-state operating range, in particular the control of the air/fuel ratio depending on the type and amount of emissions which occur and on the parameters of the internal combustion engine would be favorable. This is because in this way the oxygen reservoir during the operating points with low hydrocarbon (HC) and low carbon monoxide (CO) emissions and high nitrogen oxide emissions ($NO_x$) can be run with little oxygen filling or the oxygen reservoir can be run during the operating points with high hydrocarbon and high carbon monoxide emissions and low nitrogen oxide emissions with high oxygen filling. This is because the emissions which occur in large amounts can be efficiently converted while the emissions which occur in smaller amounts are less well converted; this is however quite acceptable in view of the small amounts.

And if the internal combustion engine is operating in the transient operating range, in particular control of the air/fuel ratio as a function of the type and amount of emissions which occur and of the parameters of the catalytic converter would be advantageous. This is because the "disturbances" which occur during transient operation of the internal combustion engine can be corrected again as quickly as possible and the optimized degree of filling of the oxygen reservoir can also be restored as quickly as possible.

Preferably the air/fuel ratio is controlled such that forced modulation is applied to the optimized degree of filling of the oxygen reservoir which is to be achieved; this degree of filling is designated below simply as the middle position of the degree of filling of the oxygen reservoir. This forced modulation which preferably takes place within the range between approximately 30% and approximately 70% of the degree of filling enables improved conversion both of the hydrocarbon and carbon monoxide and also of nitrogen oxides. This is because improved conversion of the hydrocarbon and carbon monoxide or nitrogen oxides takes place briefly by the alternating partial filling and emptying of the oxygen reservoir, due to a certain inertia of this system an altogether improved conversion performance being obtained.

Forced modulation should always be more pronounced in steady-state operation of the internal combustion engine than in transient operation of the internal combustion engine. This is because in steady-state operation the degree of filling of the oxygen reservoir can easily execute greater modulations, while in the transient range what is important for example is to correct again disturbances which are caused by a coasting process or by a shifting process as quickly as possible so that the degree of filling of the oxygen reservoir should then not execute any major modulations, but at least initially should be adjusted as directly as possible to its optimum value.

The amplitude and/or the frequency of the forced modulation which is applied to the optimized degree of filling is especially preferably varied depending on at least one parameter of the internal combustion engine, at least one parameter of the catalytic converter and/or depending on the type and amount of the exhaust gas emissions currently taking place. The operating conditions prevailing at the time can be taken into account by this variation for example in transient operation of the internal combustion engine and the amplitude of the forced modulation can be adjusted at least initially to be very small or towards zero and the frequency of the forced modulation can be adjusted to be very large in order to then implement favorable re-adjustment or reinitiation of forced modulation.

Moreover, the middle position, the amplitude and the frequency can also be stipulated as a function of the time derivative or rate of change of at least one parameter of the internal combustion engine, at least one parameter of the catalytic converter and/or as a function of the time change of the type and amount of currently occurring exhaust gas emissions, so that transient operation of the internal combustion engine can be clearly detected and the optimized degree of filling of the oxygen reservoir can be changed in an adapted manner.

It is advisable to take the engine speed and/or load into account as parameters of the internal combustion engine. This is because these parameters provide information about when for example small amounts of hydrocarbon and carbon monoxide and large amounts of nitrogen oxides are present, so that the oxygen reservoir should be operated with little filling or when for example large amounts of hydrocarbon and carbon monoxide and small amounts of nitrogen oxides are present, so that the oxygen reservoir should be operated with higher filling in order to achieve more favorable conversion of the respective predominating emissions conversion.

The degree of thermal ageing of the catalytic converter, the degree of it poisoning and its temperature can be taken into account as the parameters of the catalytic converter. The current state of the catalytic converter can be easily determined by these parameters so that the oxygen reservoir integrated into it can be operated with optimum filling according to its remaining storage capacity. Optimized filling corresponds to approximately half of the existing reservoir capacity so that for transient operation of the internal combustion engine both for filling and also emptying of the oxygen reservoir a maximum volume is kept in readiness.

The type and amount of exhaust gas emissions currently occurring can be taken into account not only indirectly by way of the operating parameters of the internal combustion engine, but also directly by way of at least one exhaust gas probe located in the exhaust line, and especially hydrocarbon, carbon monoxide, nitrogen oxides and oxygen in the exhaust gas should be detected so that the major fluctuations which occur during transient operation of the internal combustion engine can again be promptly compensated. Thus, for example, the admission of oxygen which occurs during the coasting mode of the internal combustion engine can be directly recognized and then can be immediately cleared out again or the discharge of oxygen which occurs during the full load operation of the internal combustion engine can be recognized and then refilled.

Preferably the dependent relationship between at least one parameter of the internal combustion engine, at least one parameter of the catalytic converter and/or the type and amount of exhaust gas emissions and the optimization of the degree of filling of the oxygen reservoir and amplitude and frequency of the forced modulation of the optimized degree of filling can be stored in a number of engine characteristics maps. Thus, for example, the selected controlled variables can be individually weighted before they are ultimately incorporated into the control of the air/fuel ratio for optimization of the degree of oxygen filling.

BREIF DESCRIPTION OF THE DRAWINGS

This invention is detailed below using the following drawings, in which

FIGS. 3a, 3b, 3c show an overview of the exhaust gas emissions which occur for different parameters of the internal combustion engine and of the optimized degree of filling of the oxygen reservoir;

FIG. 5 shows a representation of the degree of filling of the oxygen reservoir during steady-state operation and during transient operation of the internal combustion engine.

DETAILED DESCRIPTION OF THE INVENTION

Figure 1:
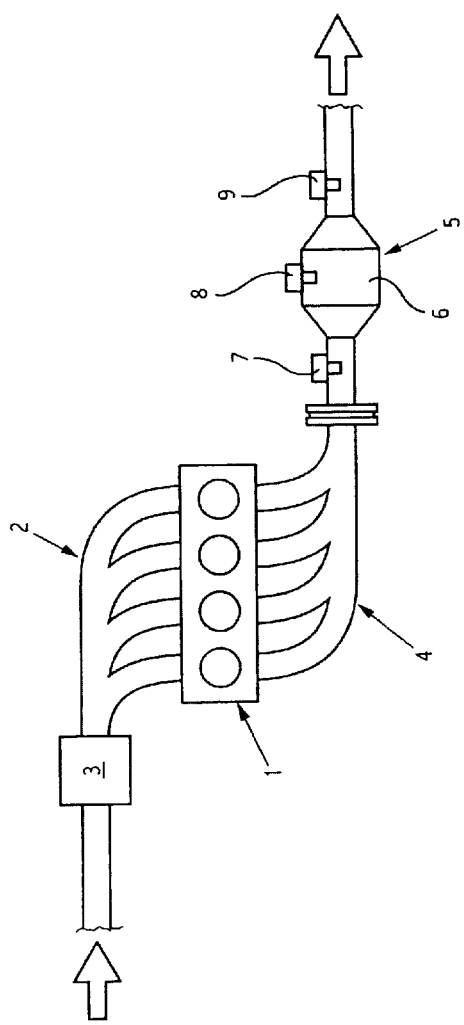
FIG. 1 shows a schematic of an internal combustion engine which operates using the process as claimed in the invention.

FIG. 1 shows an internal combustion engine 1 with a control means 3 located in the intake line 2 for control of the air/fuel ratio supplied to the internal combustion engine 1 and with a catalytic converter 5 which is located in the exhaust line 4 and which has an integrated oxygen reservoir 6 for conversion of the exhaust gas emissions.

The control means 3 is connected by way of different signal lines to the internal combustion engine 1, the catalytic converter 5 and diverse exhaust gas probes 7, 8, 9 so that when the air/fuel ratio is being controlled at least one parameter of the internal combustion engine 1, such as for example the engine speed or the load, at least one parameter of the catalytic converter 5, such as for example the degree of its thermal aging, the degree of its poisoning or its temperature, and/or the type and amount of exhaust gas emissions currently occurring, such as hydrocarbon, carbon monoxide, nitrogen oxides and/or oxygen, can be taken into account. Depending on one or more of these quantities the air/fuel ratio can then be controlled such that an optimum degree of filling of the oxygen reservoir 6 of the catalytic converter 5 is reached.

Figure 2:
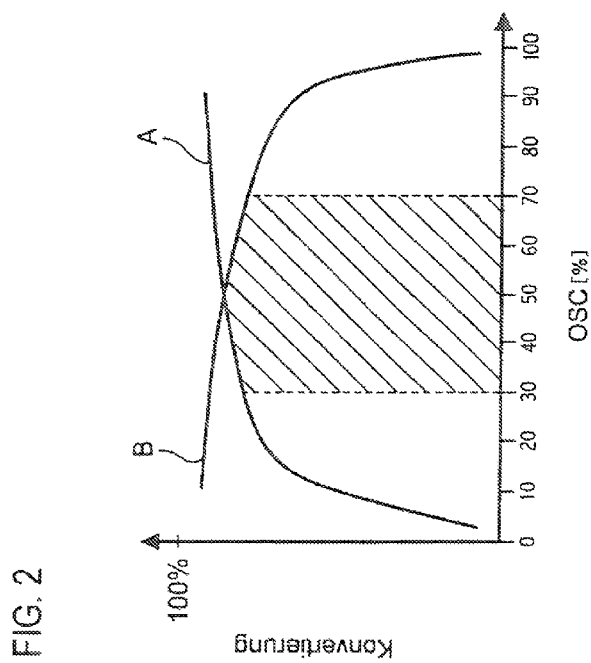
FIG. 2 shows a representation of the conversion performance of hydrocarbon and nitrogen oxides as a function of the degree of oxygen filling of the oxygen reservoir which is integrated in the catalytic converter.

FIG. 2 shows the conversion of the hydrocarbon (HC) or carbon monoxide (CO) and the conversion of nitrogen oxides ($NO_x$) as a function of the degree of filling of the oxygen reservoir 6 of the catalytic converter 5, which degree is designated as OSC, conversion of HC and CO being shown as line A and conversion of $NO_x$ being shown as line B.

It becomes apparent therefrom that the conversion of the hydrocarbon (HC) and of the carbon monoxide (CO) which is associated with oxidation and absorption of oxygen ($O_2$) is very high at a degree of oxygen filling of approximately 30% to 100%, while the conversion of these exhaust emissions deteriorates drastically at a smaller degree of filling of the oxygen reservoir 6.

In contrast, conversion of the nitrogen oxides ($NO_x$) which is associated with a reduction or release of oxygen ($O_2$) is very high at a degree of oxygen filling of approximately 0% to 70%, while the conversion of nitrogen oxides ($NO_x$) is very poor at a higher degree of filling of the oxygen reservoir 6.

Accordingly the degree of filling of the oxygen reservoir 6 of the catalytic converter 5 should always lie within the cross-hatched area of 30% to 70% of the oxygen reservoir capacity, the optimized degree of filling being shifted more to the lower boundary or more to the upper boundary of the oxygen reservoir capacity, depending on the operating conditions of the internal combustion engine 1, the degree of aging of the catalytic converter 5, and depending on the type and amount of exhaust emissions currently occurring. By considering these quantities a degree of filling of the oxygen reservoir 6 which is matched to the existing conversion performance and to the required conversion demand can be adjusted and thus optimum exhaust gas clean-up can be achieved at all times.

FIG. 3*a* and FIG. 3*b* each show an overview of the exhaust gas emissions which occur for the different parameters or load states of the internal combustion engine 1 in different amounts, specifically hydrocarbons in FIG. 3*a* and nitrogen oxides in FIG. 3*b*. Here the arrows pointed down indicate a small amount of emission, the horizontal arrows a medium amount of emission and the arrows pointed up indicate a large amount of emission. Furthermore, FIG. 3*c* shows an overview of the degree of filling OSC of the oxygen reservoir 6 which has been optimized for the different load states of the internal combustion engine 1 and the different exhaust gas emissions. This shows that the optimized degree of filling is matched to the emissions—hydrocarbon or nitrogen oxides—which occur in large amounts so that for overall favorable conversion of the exhaust gas for large amounts of hydrocarbons, filling or raising the degree of filling of the oxygen reservoir 6 and for large amounts of nitrogen oxides emptying or reducing the degree of filling of the oxygen reservoir take place. For approximately the same or medium amounts of hydrocarbon and nitrogen oxides the degree of filling of the oxygen reservoir 6 conversely is kept neutral or constant.

Figure 4:
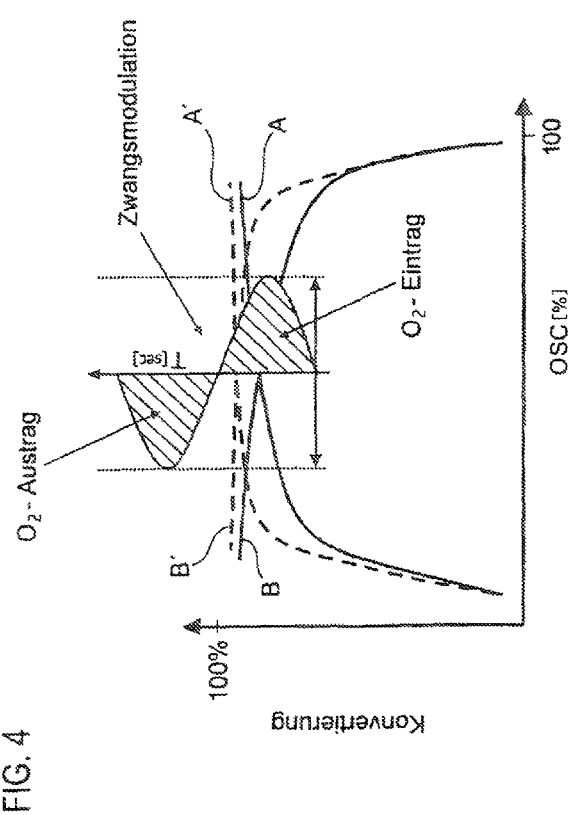
FIG. 4 shows a simplified representation of forced modulation of the degree of oxygen filling of the catalytic converter and its influence on the conversion performance.

FIG. 4 finally shows the forced modulation of the oxygen reservoir 6 plotted over time T, the optimized degree of filling determined beforehand corresponding to the middle position of forced modulation. For forced modulation the oxygen reservoir 6 is partially filled in alternation with oxygen ($O_2$) and partially emptied of oxygen ($O_2$) by the control means 3 of the air/fuel ratio, the peaks and valleys of the degree of filling at any instant lying within the aforementioned range of the oxygen reservoir capacity. Both the conversion of the hydrocarbon (HC) and carbon monoxide (CO) and also the conversion of nitrogen oxides ($NO_x$) are improved by forced modulation, the improved conversion of HC and CO being indicated as a broken line A' and the improved conversion of $NO_x$ as a broken line B'.

The middle position, the amplitude and the frequency of the forced modulation of the optimized degree of filling are appropriately controlled depending on at least one parameter of the internal combustion engine 1, at least one parameter of the catalytic converter 5 and/or the type and amount of the exhaust emissions currently occurring and optionally as a function of their time derivative and their rate of change, in order to enable ideal re-adjustment during transient operation of the internal combustion engine 1 and to again clear out or fill the oxygen reservoir 6 again as quickly as possible.

FIG. 5 shows according to the curves C, C', C" the behavior of the optimized degree of filling OSC of the oxygen reservoir 6 during steady-state operation of the internal combustion engine 1, and starting with the "disturbance" which occurs at time $T_S$ according to curves D, E, the behavior of the degree of filling of the oxygen reservoir 6 during transient operation of the internal combustion engine 1.

The curves C, C' and C" of the optimized degree of filling each follow the forced modulation, its amplitude and its frequency being the same and its middle position being different. The middle position is selected as a function of the type and amount of exhaust emissions which occur so that for curve C a medium degree of filling, for curve C' a higher degree of filling and for curve C" a smaller degree of filling of the oxygen reservoir 6 is run.

Due to the disturbance which is caused in a coasting process or in a shifting process of the internal combustion engine 1, the oxygen reservoir 6 of the catalytic converter 5 according to the behavior of the component curve D is suddenly exposed to large amounts of oxygen so that it is filled completely within an extremely short time. For efficient conversion performance the oxygen reservoir 6 must then be emptied again extremely quickly. To this end the air/fuel ratio is accordingly adjusted to be rich, forced modulation being applied to this adjustment, which modulation however appropriately begins only starting with a certain emptying of the oxygen reservoir 6, i.e., below 70%, as is shown in the component curve E.

Consequently, the control of the air/fuel ratio when the oxygen reservoir 6 is being completely emptied should be managed such that the air/fuel mixture is adjusted to be lean and forced modulation, which however appropriately begins only starting with a certain filling of the oxygen reservoir 6, i.e., above 30%, is applied to this adjustment.

LIST OF REFERENCE NUMBERS

1 internal combustion engine
2 intake line
3 control means
4 exhaust line
5 catalytic converter
6 oxygen reservoir
7,8,9 exhaust probes
A HC and CO conversion
A' improved HC and CO conversion
B $NO_x$ conversion
B' improved $NO_x$ conversion
C,C',C" degree of filling of the oxygen reservoir during steady-state operation of the internal combustion engine
D,E degree of filling of the oxygen reservoir during transient operation of the internal combustion engine

The invention claimed is:

1. A process for control of the supplied air/fuel ratio of an internal combustion engine with a catalytic converter which is located in the exhaust gas line, with an integrated oxygen reservoir, the method comprising
controlling the air/fuel ratio as a function of:
at least one parameter of the internal combustion engine,
at least one parameter of the catalytic converter, and
as a function of the type and amount of the exhaust gas emissions which are currently occurring, in order to maintain the relative degree of filling of the oxygen reservoir contained in the catalytic converter between 30% and 70%,
applying a forced modulation of the oxygen reservoir to control the air/fuel ratio, whereby in alternation the oxygen reservoir is partially filled with oxygen and then partially emptied of oxygen.

2. The process as claimed in claim 1, wherein at least one of the amplitude and the frequency of the forced modulation is stipulated depending on at least one parameter of the internal combustion engine, of the catalytic converter and/or depending on the type and amount of the exhaust gas emissions which are currently occurring.

3. The process as claimed in claim 1, wherein the middle position, the amplitude, and the frequency of forced modulation is stipulated as a function of the time change of at least one of one parameter of the internal combustion engine, at least one parameter of the catalytic converter and as a function of the time change of the type and amount of the currently occurring exhaust gas emissions.

4. The process as claimed in claim 1, wherein the engine speed and the load are taken into account as the parameters of the internal combustion engine.

5. The process as claimed in claim 1, wherein at least one of the degree of thermal ageing of the catalytic converter, the degree of its poisoning, and its temperature are taken into account as parameters.

6. The process as claimed in claim 1, wherein at least one of hydrocarbon (HC), carbon monoxide (CO), nitrogen oxides ($NO_x$), and oxygen ($O_2$) are taken into account in the type of the currently occurring exhaust gas emissions.

7. The process as claimed in claim 1, wherein the relationship between at least one of one parameter of the internal combustion engine, at least one parameter of the catalytic converter, and the type and amount of exhaust gas emissions currently occurring and the optimization of the degree of filling of the oxygen reservoir as well as the amplitude and frequency of the forced modulation of the optimized degree of filling are stored in a number of engine characteristics maps.

8. The process as claimed in claim 1, wherein the degree of thermal ageing of the catalytic converter, is taken into account as a parameter.

* * * * *